(12) United States Patent
Matsumura et al.

(10) Patent No.: US 11,149,172 B2
(45) Date of Patent: Oct. 19, 2021

(54) HOT MELT COMPOSITION

(71) Applicant: The Yokohama Rubber Co., LTD., Tokyo (JP)

(72) Inventors: Misaki Matsumura, Hiratsuka (JP); Tomohiro Kawasaki, Hiratsuka (JP)

(73) Assignee: The Yokohama Rubber Co., LTD.

( * ) Notice: Subject to any disclaimer, the term of this patent is extended or adjusted under 35 U.S.C. 154(b) by 161 days.

(21) Appl. No.: 16/474,541

(22) PCT Filed: Dec. 15, 2017

(86) PCT No.: PCT/JP2017/045191
§ 371 (c)(1),
(2) Date: Jun. 27, 2019

(87) PCT Pub. No.: WO2018/123665
PCT Pub. Date: Jul. 5, 2018

(65) Prior Publication Data
US 2019/0338169 A1    Nov. 7, 2019

(30) Foreign Application Priority Data
Dec. 27, 2016   (JP) .............................. JP2016-253672

(51) Int. Cl.
| | | |
|---|---|---|
| C08K 3/26 | (2006.01) | |
| C09J 153/00 | (2006.01) | |
| F21S 43/27 | (2018.01) | |
| F21S 41/29 | (2018.01) | |
| C09J 5/06 | (2006.01) | |
| C09J 11/06 | (2006.01) | |
| C09J 11/08 | (2006.01) | |
| F21V 17/10 | (2006.01) | |

(52) U.S. Cl.
CPC .............. *C09J 153/00* (2013.01); *C09J 5/06* (2013.01); *C09J 11/06* (2013.01); *C09J 11/08* (2013.01); *F21S 41/29* (2018.01); *F21S 43/27* (2018.01); *F21V 17/101* (2013.01); *C09J 2453/00* (2013.01); *C09J 2491/00* (2013.01)

(58) Field of Classification Search
None
See application file for complete search history.

(56) References Cited

U.S. PATENT DOCUMENTS

| 6,613,381 B1* | 9/2003 | Bredahl | .................. | C09J 201/00 |
|---|---|---|---|---|
| | | | | 427/207.1 |
| 2007/0093396 A1 | 4/2007 | Okazaki | | |
| 2009/0042754 A1 | 2/2009 | Okazaki | | |
| 2009/0042755 A1 | 2/2009 | Okazaki | | |
| 2010/0105587 A1 | 4/2010 | Okazaki | | |
| 2010/0105591 A1 | 4/2010 | Rosenbaum et al. | | |
| 2010/0173809 A1 | 7/2010 | Okazaki | | |
| 2012/0250344 A1* | 10/2012 | Koshiba | .................. | F21S 41/28 |
| | | | | 362/540 |
| 2016/0115312 A1* | 4/2016 | Bahl | ..................... | C09J 153/02 |
| | | | | 524/313 |
| 2017/0145205 A1 | 5/2017 | Makino et al. | | |
| 2019/0040289 A1 | 2/2019 | Dobashi et al. | | |

FOREIGN PATENT DOCUMENTS

| JP | H09-227858 | 9/1997 |
|---|---|---|
| JP | H11-130926 | 5/1999 |
| JP | 2000-010357 | 1/2000 |
| JP | 2011-080021 | 4/2001 |
| JP | 2002-284943 | 10/2002 |
| JP | 2006-143760 | 6/2006 |
| JP | 2008-127473 | 6/2008 |
| JP | 2009-513781 | 4/2009 |
| JP | 2009-249034 | 10/2009 |
| JP | 2011-153227 | 8/2011 |
| JP | 2011-162747 | 8/2011 |
| JP | 2011-190287 | 9/2011 |
| JP | 2012-017392 | 1/2012 |
| JP | 3177964 | 8/2012 |
| JP | 2012-246400 | 12/2012 |
| JP | 2013-028654 | 2/2013 |
| JP | 2013-163707 | 8/2013 |
| JP | 2015-028119 | 2/2015 |
| JP | 2016-060758 | 4/2016 |
| JP | 2017-179061 | 10/2017 |
| JP | 2017-186527 | 10/2017 |
| JP | 2017-214479 | 12/2017 |
| WO | WO 2007/050451 | 5/2007 |
| WO | WO 2011/043231 | 4/2011 |
| WO | WO 2015/002308 | 1/2015 |
| WO | WO 2015/198883 | 12/2015 |
| WO | WO 2017/209309 | 12/2017 |

OTHER PUBLICATIONS

Machine Translation of JPH 09227858 p. 1-8 (Year: 1997).*
International Search Report for International Application No. PCT/JP2017/045191 dated Mar. 13, 2018, 6 pages, Japan.
International Search Report for International Application No. PCT/JP2017/045191 dated Mar. 3, 2018, 6 pages, Japan.
Fritz S. Rustler, Classification of Petroleum-Based Plasticizers and Spreading Agents (Rostler Method) and Their Technical Features, 17 pages, Japan.

* cited by examiner

Primary Examiner — Robert T Butcher
(74) Attorney, Agent, or Firm — Thorpe North & Western

(57) ABSTRACT

The present technology provides a hot melt composition containing: styrene-based thermoplastic elastomer having a weight average molecular weight of 300000 or more; tackifier; a first paraffin oil having a weight average molecular weight of 1000 or more; and a second paraffin oil having a weight average molecular weight of less than 1000.

7 Claims, No Drawings

HOT MELT COMPOSITION

TECHNICAL FIELD

The present technology relates to a hot melt composition.

BACKGROUND ART

Conventionally, hot melt compositions have been used for adhesion of lenses with housings in vehicle lighting appliances (for example, vehicle lamps like headlamps).

For example, Japan Unexamined Patent Publication No. 2008-127473 proposes a hot melt composition.

Japan Unexamined Patent Publication No. 2008-127473 provides a hot melt composition having excellent sealing properties and disassembly properties relative to polyolefin describes an easily-disassemble hot melt composition. The easily-disassemble hot melt composition contains tackifier having a hydroxyl value of 20 to 200 (mgKOH/g) by 5 to 500 parts by mass and hydrocarbon plasticizer of 350 to 2000 parts by mass per 100 parts by mass of one or both of SEEPS (styrene-ethylene-ethylene-propylene-styrene block copolymer) and SEBS (styrene-ethylene-butylene-styrene block copolymer) having a weight average molecular weight of 250000 or more.

In such a circumstance, the present inventors prepared hot melt compositions with reference to Japan Unexamined Patent Publication No. 2008-127473 and evaluated the hot melt compositions. The present inventors have found that the compositions exhibit volatility, high viscosity, and low workability, and the resulting adhesives flow or are softened, or exhibit low adhesive properties with substrates. The compositions having volatility result in misty lenses in vehicle lighting appliances.

SUMMARY

The present technology provides a hot melt composition excellent in resistance to volatility, workability, resistance to fluidity (specifically, for example, a resultant adhesive is less likely to soften or deform at a high temperature, and the same applies to the following), and adhesive properties.

The present inventors have discovered that a combination use of predetermined paraffin oils 1 and 2 having different weight average molecular weight ranges for styrene-based thermoplastic elastomer having a weight average molecular weight in a predetermined range and tackifier allows obtaining desired effects.

The present technology is based on the findings described above and, specifically, provides the following features.

1. A hot melt composition containing: a styrene-based thermoplastic elastomer having a weight average molecular weight of 300000 or more; a tackifier; a paraffin oil 1 having a weight average molecular weight of 1000 or more; and a paraffin oil 2 having a weight average molecular weight of less than 1000.

2. The hot melt composition according to 1 in which the styrene-based thermoplastic elastomer is SEEPS.

3. The hot melt composition according to 1 or 2 is as follows. The tackifier contains aromatic tackifier. The tackifier is contained by 100 parts by mass or more per 100 parts by mass of the styrene-based thermoplastic elastomer.

4. The hot melt composition according to any one of 1 to 3 in which the paraffin oil 1 has a mass ratio to the paraffin oil 2 (paraffin oil 1/paraffin oil 2) from 5/95 to 95/5.

5. The hot melt composition according to any one of 1 to 4 used for a vehicle lamp.

The hot melt composition according to an embodiment of the present technology is excellent in resistance to volatility, workability, resistance to fluidity, and adhesive properties.

DETAILED DESCRIPTION

Embodiments of the present technology are described in detail below.

In the present specification, "(meth)acryl" refers to "acryl" or "methacryl."

Furthermore, in the present specification, numerical ranges indicated using "(from) . . . to . . . " include the former number as the lower limit value and the later number as the upper limit value.

In the present specification, unless otherwise noted, a single corresponding substance may be used for each component, or a combination of two or more types of corresponding substances may be used for each component. When a component contains two or more types of substances, the content of the component means the total content of the two or more types of substances.

In the present specification, there may be a case where at least one of resistance to volatility, workability, resistance to fluidity, or adhesive properties being further excellent is referred to as the effect of the present technology being further excellent.

Hot Melt Composition

The hot melt composition according to the embodiment of the present technology (the composition according to the embodiment of the present technology) contains styrene-based thermoplastic elastomer having a weight average molecular weight of 300000 or more, tackifier, paraffin oil 1 having a weight average molecular weight of 1000 or more, and paraffin oil 2 having a weight average molecular weight of less than 1000.

Each of the components contained in the composition according to an embodiment of the present technology will be described in detail below.

Styrene-Based Thermoplastic Elastomer

The composition according to the embodiment of the present technology contains styrene-based thermoplastic elastomer having a weight average molecular weight (Mw) of 300000 or more.

As long as the styrene-based thermoplastic elastomer is thermoplastic polymer having repeating units produced with styrene or styrene derivatives, the styrene-based thermoplastic elastomer is not particularly limited.

Examples of the styrene-based thermoplastic elastomer include styrene-isoprene-styrene block copolymer (SIS), styrene-butadiene-styrene block copolymer (SBS), styrene-ethylene-propylene-styrene block copolymer (SEPS), styrene-ethylene-butylene-styrene block copolymer (SEBS), and styrene-ethylene-ethylene-propylene-styrene block copolymer (SEEPS).

Among these, from a perspective of providing the further excellent effect of the present technology, SEBS and SEEPS are preferable, and SEEPS is more preferable.

Weight Average Molecular Weight of Styrene-Based Thermoplastic Elastomer

In the present technology, the styrene-based thermoplastic elastomer has the weight average molecular weight of 300000 or more.

From a perspective of providing the further excellent effect of the present technology and excellent heat resistance and mechanical properties, the styrene-based thermoplastic elastomer preferably has the weight average molecular weight from 300000 to 600000 and more preferably from 450000 to 550000.

In the present technology, the weight average molecular weight of the styrene-based thermoplastic elastomer is a value in terms of standard polystyrene based on a measured value by gel permeation chromatography (GPC) with the use of tetrahydrofuran (THF) as a solvent.

One or two or more kinds of the styrene-based thermoplastic elastomer in combination is usable.

A method for producing the styrene-based thermoplastic elastomer is not particularly limited. Examples thereof include known products.

Tackifier

As long as viscosity can be provided to a hot melt composition, the tackifier contained in the composition according to the embodiment of the present technology is not particularly limited.

Examples of the tackifier include rosin resin, terpene resin, petroleum resin, aromatic tackifier, atactic polypropylene (APP), and amorphous polyolefin (APAO).

The aromatic tackifier means a compound that can provide tackiness to the composition and has an aromatic hydrocarbon group.

The amorphous polyolefin (APAO) means an amorphous polymer in which the main chain backbone is derived from α-olefin.

From a perspective of providing the further excellent effect of the present technology (particularly adhesive properties) and excellent heat resistance, preferably the tackifier contains the aromatic tackifier.

The aromatic tackifier in the form of polymer is one preferable aspect.

Examples of the polymer having the aromatic hydrocarbon group as the tackifier include copolymer of styrene or styrene derivatives (for example, 4-methyl-α-methyl-styrene) with indene.

One or two or more kinds of the tackifier in combination is usable.

A method for producing the tackifier is not particularly limited. Examples thereof include known products.

Note that the tackifier according to the embodiment of the present technology does not contain styrene-based thermoplastic elastomer and paraffin oil.

Content of Tackifier

From a perspective of providing the further excellent effect of the present technology and, in particular, excellent adhesive properties when heated, preferably the tackifier has the content of 100 parts by mass or more per 100 parts by mass of the styrene-based thermoplastic elastomer, and from 200 to 400 parts by mass is more preferable.

Paraffin Oil 1

The composition according to the embodiment of the present technology contains the paraffin oil 1 having a weight average molecular weight (Mw) of 1000 or more.

In the present technology, the paraffin oil (the paraffin oil includes paraffin oils 1 and 2, and the same applies to the following) means paraffin oil produced by purifying hydrogenated petroleum fraction or residual oil or lubricant base oil obtained through decomposition.

An example of one preferable aspect of the paraffin oil meets a formula $C_nH_{2n+2}$. Note that in the present technology, the above-described n can be values according to the respective weight average molecular weights of the paraffin oils 1 and 2.

An example of one preferable aspect is that the paraffin oil is liquid at room temperature.

In the present technology, the paraffin oil 1 has the weight average molecular weight of 1000 or more.

The paraffin oil 1 can have the weight average molecular weight from 1000 to 3000.

In the present technology, the respective weight average molecular weights of the paraffin oils 1 and 2 are values in terms of standard polystyrene based on measured values by gel permeation chromatography (GPC) with the use of tetrahydrofuran (THF) as a solvent. A column (MIXED-E manufactured by Polymer Laboratories Ltd.) was used as a measurement instrument.

Paraffin Oil 2

The composition according to the embodiment of the present technology contains the paraffin oil 2 having the weight average molecular weight (Mw) of less than 1000.

In the present technology, the paraffin oil 2 has the weight average molecular weight of less than 1000.

The paraffin oil 2 can have the weight average molecular weight from 500 to less than 1000.

(Paraffin Oil 1/Paraffin Oil 2)

The paraffin oil 1 preferably has a mass ratio to the paraffin oil 2 (paraffin oil 1/paraffin oil 2) from 5/95 to 95/5, and from 90/10 to 50/50 is more preferable.

Total Content of Paraffin Oils 1 and 2

From a perspective of providing the further excellent effect of the present technology and excellent heat resistance, the total content of the paraffin oil 1 and the paraffin oil 2 is preferably from 500 to 3000 parts by mass and more preferably from 500 to 1500 parts by mass per 100 parts by mass of the styrene-based thermoplastic elastomer.

As necessary, the composition according to the embodiment of the present technology can additionally contain additive. Examples of the additive include rubber other than styrene-based thermoplastic elastomer, anti-aging agent, antioxidant, UV absorbent, filler, softener or plasticizer other than paraffin oil, and reinforcing agent. Contents of the additives can be adjusted as desired.

A method for producing the composition according to the embodiment of the present technology is not particularly limited. For example, mixing the above-described critical components and the additive that can be used as necessary at from 150 to 250° C. allows producing the composition.

An example of the method for using the composition according to the embodiment of the present technology includes a method in which the composition according to the embodiment of the present technology heated to 190 to 230° C. and melted is applied to an adherend (for example, a first member and/or a second member) to produce a joint body or a layered body (of the first member and the second member) and the joint body or the layered body is left at room temperature to solidify the composition according to the embodiment of the present technology. A texture of the second member may be the same or different from that of the first member.

Examples of the adherend to which the composition according to the embodiment of the present technology is applicable include plastic (for example, polyolefin such as polypropylene; polycarbonate; and (meth)acrylic resin), wood, rubber, and glass.

The use of the composition according to the embodiment of the present technology for adhesion of polycarbonate resin or (meth)acrylic resin; that is, adhesion of polycarbonate resin or (meth)acrylic resin with polypropylene is preferable aspect.

An example of the method for applying the composition according to the embodiment of the present technology to the adherend includes a method using a discharging device (applicator).

The composition according to the embodiment of the present technology is usable as the hot-melt composition for a lamp. Examples of the lamp include a vehicle lamp (for example, a headlamp and a rear combination lamp) and a two-wheeled vehicle (motorcycle) lamp. In the case of the vehicle lamp, the composition according to the embodiment of the present technology is usable for sealing (adhesion) of a lens with a housing of the vehicle lamp and a seal portion of the lens.

The composition according to the embodiment of the present technology after use can function as, for example, an adhesive and a sealant.

One preferable aspect of the composition according to the embodiment of the present technology after use is to have an easily-disassemble property (easily-separable property).

The disassembly property means that after the first member and the second member are bonded together with the composition according to the embodiment of the present technology, when the second member is removed from the first member, the adhesive (the composition according to the embodiment of the present technology) is easily peeled from an interface.

EXAMPLES

The present technology is described below in detail using examples but the present technology is not limited to such examples.

Production of Composition

Using any of styrene-based thermoplastic elastomers 1 to 4 and paraffin oil 2-1 and/or paraffin oil 1-1 depicted in the following Table 1 by amounts (parts by mass) depicted in the table, these substances were put into a 1 L double-arm kneader (manufactured by Nihon Spindle Manufacturing Co., Ltd.) and stirred at 220° C. for 40 minutes to obtain a mixture. Next, tackifiers 1 and 2 and anti-aging (anti-aging agent) depicted in the table were added to the mixture, and the mixture was kneaded for another one hour to obtain a hot melt composition.

Evaluation

The following evaluations were performed using the composition produced as described below. Table 1 depicts the results.

Workability

After melting the composition produced as described above for 30 minutes at 220° C., the composition was rotated using a No. 29 rotor using a BF viscometer (Brookfield viscometer), and viscosity of the composition was measured at 5 rpm compliant to JIS (Japanese Industrial Standard) K 6833-1 for evaluation.

The viscosity of 100000 mPa·s or less was evaluated as "Excellent" (extremely excellent workability), the viscosity in excess of 100000 mPa·s and 200000 mPa·s or less was evaluated as "Good" (slightly excellent workability), and the viscosity in excess of 200000 mPa·s was evaluated as "Poor" (poor workability).

Resistance to Fluidity

The composition produced as described above was cooled at 20° C., and JIS dumbbell No. 2 (JIS K 6251) (thickness: 2 mm) test pieces were sampled from the composition. Next, a heating test that puts the test pieces in an oven at 130° C. for 10 days was conducted. After the heating test, the shapes of the test pieces were visually observed.

Shapes of the test pieces after the heat test that maintained the shapes before the heat test were evaluated as "Good" (excellent resistance to fluidity), and shapes of the test pieces after the heat test that failed to maintain the shapes before the heat test and softened or deformed were evaluated as "Poor" (poor resistance to fluidity).

Adhesive Properties

The composition produced as described above was heated to 220° C. to be melted, and applied to a PP plate (made of polypropylene, length 25 mm×width 75 mm×thickness 3 mm) with a hot shot gun. Immediately after the application, a PC plate (made of polycarbonate, length 25 mm×width 75 mm×thickness 3 mm) was stacked on the PP plate so as to form a cross, compression bonding was performed on the composition by an adhesion area of 25 mm×25 mm=6.25 $cm^2$ up to 1-mm thickness. Then, the composition was left with conditions of 20° C. and RH of 50% for one day for aging, thus obtaining test pieces.

A tensile test was conducted on the obtained test pieces using a tensile tester with conditions of 20° C. and a tensile speed of 10 mm/min to measure peel strengths and elongations at break of the test pieces.

Table 1 depicts the results the maximum peel strength as the maximum strength (N) and the elongation at break as the maximum elongation (mm) measured in the respective test pieces.

Volatility

The test tube was loaded with the composition of 3 g produced as described above and the top of the test tube was sealed with a glass plate. The test tube was immersed in an oil bath at 120° C. and heated.

After 24 hours from the start of heating, presence/absence of dirt on an inner surface of the glass plate (a part constituting the sealed space with the test tube) was visually checked.

TABLE 1-1

|  | Example 1 | Example 2 | Example 3 | Example 4 |
| --- | --- | --- | --- | --- |
| Styrene-based thermoplastic elastomer 1 | 100 | 100 | 100 |  |
| Styrene-based thermoplastic elastomer 2 |  |  |  | 100 |
| Styrene-based thermoplastic elastomer 3 (comparison) |  |  |  |  |
| Styrene-based thermoplastic elastomer 4 |  |  |  |  |
| Tackifier 1 | 250 | 250 | 250 | 250 |
| Tackifier 2 | 5 | 5 | 5 | 5 |
| Paraffin oil 2-1 | 800 | 450 | 200 | 800 |
| Paraffin oil 1-1 | 100 | 450 | 700 | 100 |
| Anti-aging (anti-aging agent) | 3 | 3 | 3 | 3 |
| Workability | Excellent | Good | Good | Excellent |
| Resistance to fluidity | Good | Good | Good | Good |
| Adhesive properties Maximum strength (N) | 39 | 40 | 45 | 35 |
| Adhesive properties Maximum elongation (mm) | 30 | 28 | 25 | 32 |
| Resistance to volatility | No Dirt | No Dirt | No Dirt | No Dirt |

TABLE 1-2

|  | Example 5 | Comparative Example 1 | Comparative Example 2 | Comparative Example 3 |
|---|---|---|---|---|
| Styrene-based thermoplastic elastomer 1 |  | 100 | 100 |  |
| Styrene-based thermoplastic elastomer 2 |  |  |  |  |
| Styrene-based thermoplastic elastomer 3 (comparison) |  |  |  | 100 |
| Styrene-based thermoplastic elastomer 4 | 100 |  |  |  |
| Tackifier 1 | 250 | 250 | 250 | 250 |
| Tackifier 2 | 5 | 5 | 5 | 5 |
| Paraffin oil 2-1 | 800 | 900 |  | 450 |
| Paraffin oil 1-1 | 100 |  | 900 | 450 |
| Anti-aging (anti-aging agent) | 3 | 3 | 3 | 3 |
| Workability | Good | Excellent | Poor | Good |
| Resistance to fluidity | Good | Good | Good | Poor Softened |
| Adhesive properties Maximum strength (N) | 28 | 36 | 48 | 21 |
| Adhesive properties Maximum elongation (mm) | 30 | 32 | 21 | 11 |
| Resistance to volatility | No Dirt | With Dirt | No Dirt | No Dirt |

Details of the respective components depicted in Table 1 are as follows.

TABLE 2

| Styrene-based thermoplastic elastomer 1 | SEPTON 4099 | SEEPS (Mw: 480000) | KURARAY CO., LTD. |
|---|---|---|---|
| Styrene-based thermoplastic elastomer 2 | SEPTON 4077 | SEEPS (Mw: 390000) | KURARAY CO., LTD. |
| Styrene-based thermoplastic elastomer 3 (comparison) | SEPTON 4044 | SEEPS (Mw: 250000) | KURARAY CO., LTD. |
| Styrene-based thermoplastic elastomer 4 | Kraton G1633 | SEBS (Mw: 440000) | Kraton Corporation |
| Tackifier 1 | FMR0150 | Aromatic tackifier | Mitsui Chemicals, Inc. |
| Tackifier 2 | RT2780 | APAO | REXtac, LLC. |
| Paraffin oil 2-1 | PW-90 | Mw900 | Idemitsu Kosan Co., Ltd. |
| Paraffin oil 1-1 | PW-380 | Mw1500 | Idemitsu Kosan Co., Ltd. |
| Anti-aging (anti-aging agent) | Irganox 1010 | Hindered phenol-based compound | BASF SE |

As apparent from the results depicted in Table 1, Comparative Example 1 that did not contain the predetermined paraffin oil 1 exhibited poor resistance to volatility.

Comparative Example 2 that did not contain the predetermined paraffin oil 2 exhibited high viscosity and poor workability.

Comparative Example 3 with styrene-based thermoplastic elastomer having a weight average molecular weight outside the predetermined range exhibited poor resistance to fluidity and poor adhesive properties.

In contrast, the composition according to the embodiment of the present technology exhibited excellent resistance to volatility, workability, resistance to fluidity, and adhesive properties.

The invention claimed is:

1. A hot melt composition, containing:
   a styrene-based thermoplastic elastomer having a weight average molecular weight of 300000 or more;
   a tackifier;
   a first paraffin oil having a weight average molecular weight of 1000 or more; and
   a second paraffin oil having a weight average molecular weight of less than 1000 wherein
   the tackifier contains aromatic tackifier, and
   the tackifier is contained by 100 parts by mass or more per 100 parts by mass of the styrene-based thermoplastic elastomer.

2. The hot melt composition according to claim 1, wherein the styrene-based thermoplastic elastomer is SEEPS.

3. The hot melt composition according to claim 1, wherein the first paraffin oil has a mass ratio to the second paraffin oil from 5/95 to 95/5.

4. The hot melt composition according to claim 1 used for a vehicle lamp.

5. The hot melt composition according to claim 2, wherein the first paraffin oil has a mass ratio to the second paraffin oil from 5/95 to 95/5.

6. The hot melt composition according to claim 2 used for a vehicle lamp.

7. The hot melt composition according to claim 3 used for a vehicle lamp.

* * * * *